United States Patent [19]

Härle

[11] Patent Number: 5,242,252
[45] Date of Patent: Sep. 7, 1993

[54] SELF-LOCKING THREADED CONNECTION

[76] Inventor: Anton Härle, Drechslerweg 40, W-4400 Münster, Fed. Rep. of Germany

[21] Appl. No.: 2,123

[22] Filed: Jan. 7, 1993

Related U.S. Application Data

[63] Continuation of Ser. No. 652,553, Feb. 7, 1991, abandoned.

[30] Foreign Application Priority Data

Feb. 9, 1990 [DE] Fed. Rep. of Germany ....... 4003892

[51] Int. Cl.⁵ ............................................. F16B 39/30
[52] U.S. Cl. .................................... 411/311; 411/259; 411/308; 411/929
[58] Field of Search ............... 411/308, 309, 310, 311, 411/259, 938, 937.1, 929

[56] References Cited

U.S. PATENT DOCUMENTS

| Re. 27,678 | 6/1973 | Orlomoski | 411/311 |
|---|---|---|---|
| 1,884,973 | 10/1932 | Hoke | 411/311 |
| 2,581,690 | 1/1952 | Moehle et al. | 411/308 |
| 2,788,046 | 4/1957 | Rosan | 411/311 |
| 3,069,961 | 12/1962 | Baubles | 411/311 X |
| 3,459,250 | 8/1969 | Tabor | 411/310 |
| 4,540,321 | 9/1985 | Berecz | 411/310 |
| 4,586,861 | 5/1986 | McKewan | 411/311 |

FOREIGN PATENT DOCUMENTS 2903845 8/1979 Fed. Rep. of Germany .
2645519 7/1986 Fed. Rep. of Germany .

*Primary Examiner*—Rodney M. Lindsey
*Attorney, Agent, or Firm*—Peter K. Kontler

[57] ABSTRACT

A self-locking connection between a bolt and a nut is obtained by making at least one face of at least one flight of the external thread of the bolt and/or the internal thread of the nut incongruous with the adjacent face of the other thread. This results in a clamping action along a helix at the root and/or at the crest of the other thread. The connection is self-locking in two directions if both faces of one or more flights of one of the threads are incongruous with the adjacent faces of the other thread.

15 Claims, 4 Drawing Sheets

FIG 4.a

SELF-LOCKING THREADED CONNECTION

This application is a continuation, division of application Ser. No. 07/652,553, filed Feb. 7, 1991 now abandoned.

BACKGROUND OF THE INVENTION

The invention relates to improvements in threaded connections in general, and more particularly to improvements in self-locking threaded connections. Typical examples of threaded connections to which the present invention pertains are those between a spindle, bolt or screw and a single nut or between a spindle, bolt or screw and a first nut as well as a second or lock nut.

German Pat. No. 26 45 519 C2 discloses a self-locking threaded connection wherein the root of the thread of one of the mating male and female components is provided with a ramp which is inclined relative to the axis of the respective threaded component. The inclination of the ramp with reference to the axis of the respective component is constant and is in the range of 15° to 45°, preferably between 20° and 35°. A drawback of the patented self-locking threaded connection is that a locking action can be achieved only when one of the mating components is acted upon by a force tending to move its thread axially relative to the other thread in a single predetermined direction. On the other hand, it is often desirable or necessary to provide a threaded connection which is self-locking in each of the two axial directions of mating threads, for example, to mount a nut on a screw bolt, feed screw or spindle in such a way that the internal thread of the nut is locked against the external thread of the male component irrespective of the direction of action of a force upon the nut or upon the male component in a sense to urge one face of the internal or external thread against the adjacent face of the other thread.

Another drawback of the patented threaded connection is that a rather large axial displacement of the male component relative to the nut or vice versa is necessary in order to achieve an acceptable self-locking action.

OBJECTS OF THE INVENTION

An object of the invention is to provide a threaded connection which is self-locking in two directions.

Another object of the invention is to provide novel and improved externally threaded male components for use in the threaded connection.

A further object of the invention is to provide novel and improved internally threaded female components for use in the threaded connection.

An additional object of the invention is to provide a threaded connection whose self-locking action is highly reliable.

Still another object of the invention is to provide a threaded connection wherein the faces of mating external and internal threads can move into large-area contact with each other.

A further object of the invention is to provide a tool for the cutting or forming of male and female threads on the components of the above outlined self-locking threaded connection.

Another object of the invention is to provide an implement, particularly a surgical implement, which embodies one or more self-locking threaded connections of the above outlined character.

SUMMARY OF THE INVENTION

One feature of the present invention resides in the provision of a self-locking threaded connection which comprises a male component (e.g., a spindle, bolt or screw) having an external screw thread, and at least one female component having an internal screw thread. Each screw thread has a plurality of flights, a root, a crest and two faces which flank the crest. At least one face of at least one flight of at least one of the external and internal threads has an inclination which departs from the inclination of the adjacent face of the respective flight of the other thread—so that the at least one face is incongruous with the adjacent face—when the male component mates with the female component.

The root of at least one of the external and internal threads can be provided with at least one clamping surface which is inclined with reference to the axis of the respective (male or at least one female) component and is engaged by the adjacent face of the other thread in response to the application of axial stress upon one of the components to shift one of the threads relative to the other thread and to thereby urge one face of one of the threads against the adjacent face of the other thread.

In accordance with a presently preferred embodiment, both faces of the at least one flight of the at least one thread have an inclination which departs from the inclination of adjacent faces of the other thread so that each face of the at least one flight is incongruous with the adjacent face of the other thread when the male component mates with the female component.

The crest of the at least one flight can be flattened or rounded and can be provided with a groove, e.g., with a groove having a substantially triangular cross-sectional outline.

The root of at least one of the threads can be provided with two clamping surfaces which can be mirror images of each other and each of which is inclined relative to the axis of the respective component. One clamping surface is engaged by the adjacent face of the other thread in response to the application of axial stress upon one of the components in a first direction to shift one of the threads relative to the other thread, and the other clamping surface is engaged by the adjacent face of the other thread in response to the application of axial stress upon one of the components in a second direction counter to the first direction. The clamping surfaces of neighboring flights of the respective thread preferably define a helical groove which is disposed at the root of the respective screw thread and has a substantially triangular cross-sectional outline. At least one of the clamping surfaces can be at least partly convex and/or at least partly concave.

The at least one thread has a foremost flight, and at least one face of the at least one thread has a convex portion which is provided on the foremost flight and is configurated to ensure that the foremost flight engages the other thread only at the root of the other thread.

The flights of the at least one thread include a first flight which is in substantially linear contact with the other thread and at least one additional flight which is in larger-area (i.e., surface-to-surface) contact with the other thread. The arrangement is preferably such that the at least one thread includes a series of additional flights each of which is in a different surface-to-surface contact with the other thread. The extent of surface-to-surface contact increases from additional flight to additional flight in a direction away from the first flight.

Such first flight can constitute the at least one flight of the at least one thread.

The improved threaded connection can comprise two female components which are rotatable relative to each other when they mesh with the male component. The at least one thread is or can be the internal thread of the at least one female component and the other female component has an internal thread with a plurality of flights, two faces, a root and a crest. At least one face of at least one flight of the second internal thread has an inclination which departs from the inclination of the adjacent face of the respective flight of the external thread so that the at least one face of the at least one flight of the second internal thread in incongruous with the adjacent face of the external thread when the other female component mates with the male component. The arrangement is preferably such that the at least one face of the at least one female component is a first face which confronts the other female component and the at least one face of the second internal thread is a second face which confronts the at least one female component when the two female components mate with the male component. Such threaded connection can further comprise means (e.g., an axially parallel pin receivable in aligned holes or bores of the two female components) for non-rotatably coupling the female components to each other so that they are compelled to turn as a unit relative to the male component. Furthermore, such connection can comprise at least one deformable clamping member for at least one of the female components. For example, a deformable concavo-convex clamping member in the form of a washer, diaphragm spring, undulate spring or corrugated spring can be placed between the two female components.

At least component of the improved threaded connection can constitute an element of a surgical instrument or implement, e.g., an implement of the type described in commonly owned copending patent application Ser. No. 7/629,996 filed Dec. 19, 1990 for "Screw for use in osteosynthesis".

Another feature of the present invention resides in the provision of one or more tools which can be used to cut the screw thread of the male component, of the at least one female component or of the other female component.

The novel features which are considered as characteristic of the invention are set forth in particular in the appended claims. The improved threaded connection itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

FIG. 4a is a smaller-scale partly elevational and partly axial sectional view of a second threaded connection which employs a male component of the type shown in FIG. 2 and a standard female component;

DESCRIPTION OF PREFERRED EMBODIMENTS

Figure 1:
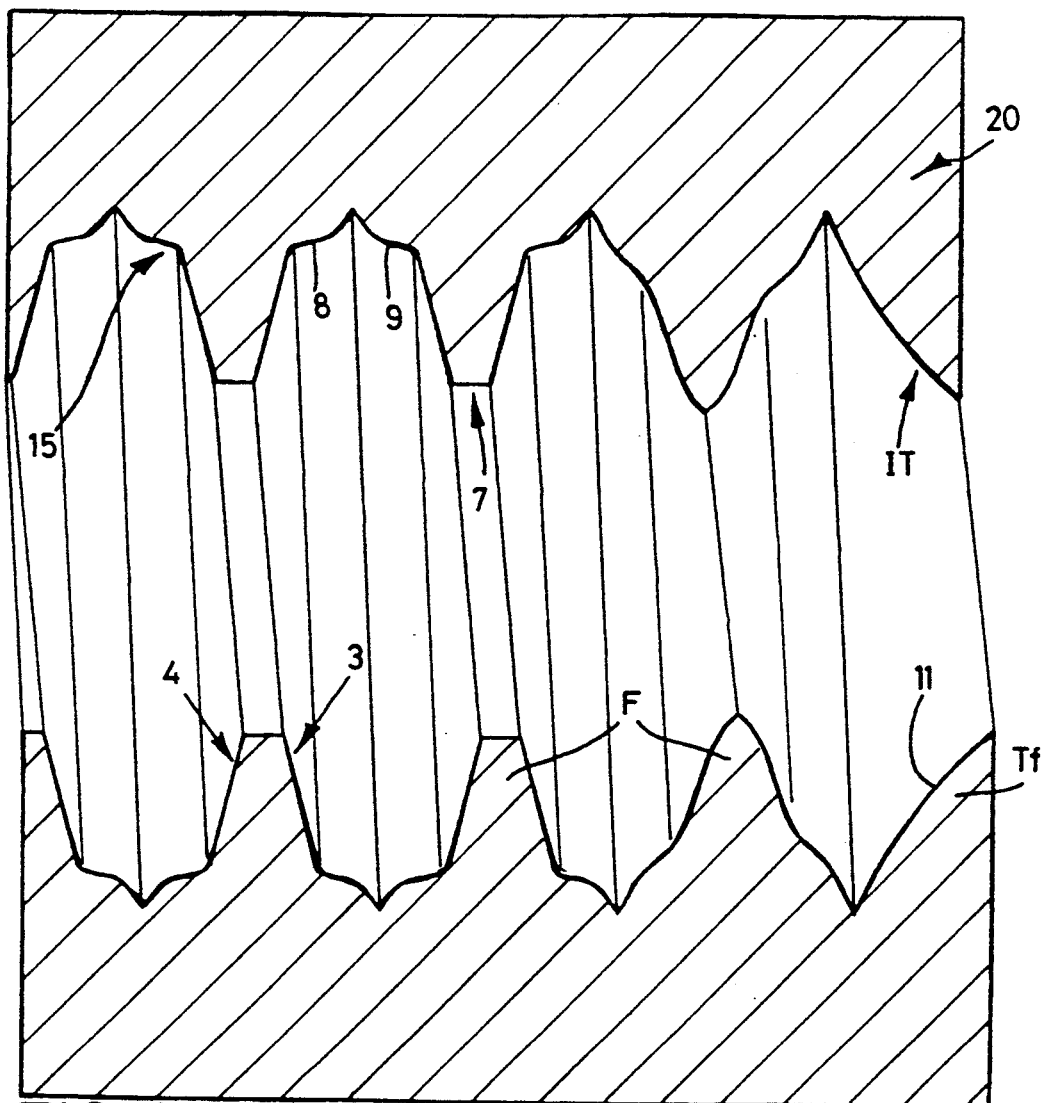
FIG. 1 is an axial sectional view of a female component of a self-locking threaded connection which embodies one form of the invention.
Figure 2:
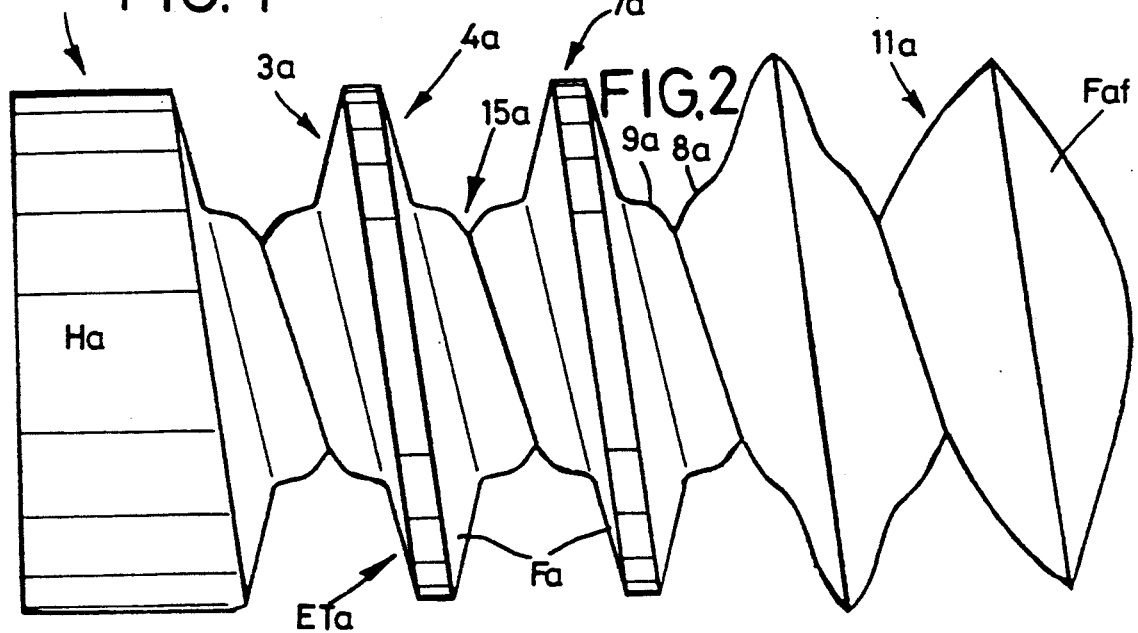
FIG. 2 is an elevational view of a male component which embodies the invention.
Figure 3A:
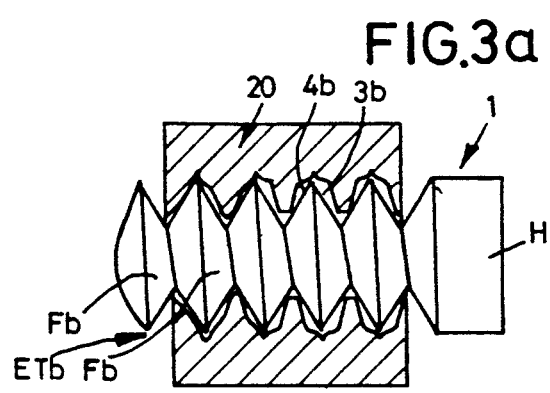
FIG. 3a is a smaller-scale partly elevational and partly axial sectional view of a threaded connection which employs a female component of the type shown in FIG. 1 and a standard male component.
Figure 3B:
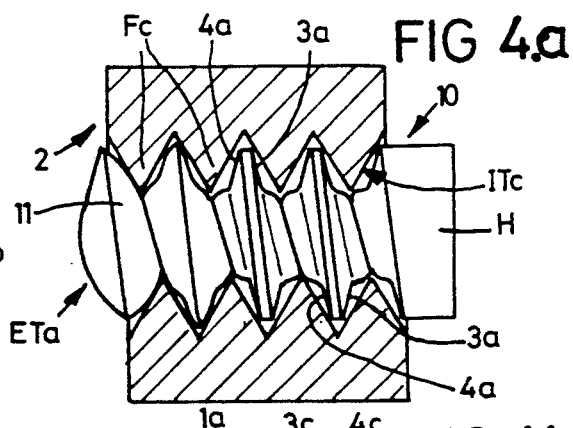
FIG. 3b shows the structure of FIG. 3a in self-locking condition as a result of the application of axial force against the female component in a direction toward the head of the male component.
Figure 3B:
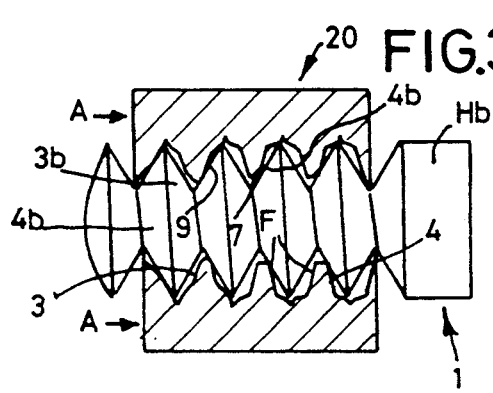
Figure 3C:
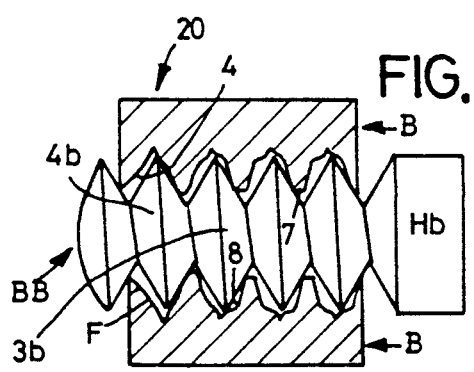
FIG. 3c shows the structure of FIG. 3b in self-locking condition as a result of the application of axial force against the female component in a direction away from the head of the male component.

FIG. 1 shows a novel internally threaded female component 20 which is a nut and can be brought into mesh with a standard externally threaded male component 1 (e.g., a screw or bolt) of the type shown in FIGS. 3a to 3c or with a novel externally threaded male component 10 (e.g., a screw or bolt) of the type shown in FIG. 2. The internal thread IT of the female component 20 (hereinafter called nut for short) has a series of flights F, a partially flattened crest 7, a root 15 and two faces 3, 4 which flank the crest 7. A comparison of FIG. 1 with FIG. 3a, 3b or 3c will indicate that the inclination of the faces 3, 4 of the novel nut 20 is more pronounced than that of the faces 3b, 4b of the external thread ETb on a standard male component 1 (hereinafter called bolt for short). Thus, when the bolt 1 is caused to mate with the nut 20, the faces 3, 4 of the internal thread IT are incongruous with the adjacent faces 3b, 4b of the external thread ETb. The internal thread IT has two partially convex and partly concave clamping surfaces 8, 9 which are mirror images of each other with reference to a plane extending at right angles to the axis of the nut 1, and such clamping surfaces define a groove having a substantially triangular cross-sectional outline. The clamping surfaces 8, 9 flank the root 15 of the internal thread IT and may but not be provided on each and every flight F.

FIG. 3b shows that the application of an axial force A upon the nut 20 in a direction toward the head Hb of the standard bolt 1 (or the application of an axial force AA upon the bolt 1 in the opposite direction) results in the establishment of linear contact between the face 4b of the bolt 1 and the clamping surface 9 to produce a self-locking action. The face 3b of the bolt 1 is in linear engagement with the clamping surface 8 when the nut 20 is acted upon by a force B (FIG. 3b) and/or the bolt 1 is acted upon by a force BB. Thus, a self-locking action is achieved irrespective of whether the bolt 1 is moved axially in the direction of arrow AA or BB or whether the nut 1 is moved axially in the direction of arrows A or B. The locking action is established in response to small or minimal axial displacement of the nut 20 relative to the bolt 1 and/or vice versa.

The self-locking action can be enhanced still further by flattening the crest 7 of the internal thread IT (see FIG. 1), either entirely or on one or more flights F. This results in the establishment of additional linear contact between the crest 7 and the face 4b (FIG. 3b) or between the crest 7 and the face 3b (FIG. 3b).

That portion of the face 4 which is provided on the foremost flight Ff of the internal thread IT of the nut 20 is convex; this is shown in FIG. 1, as at 11.

The provision of convex face portions 1, 11a on the foremost flights Ff and Faf of the nut 20 and bolt 10 ensures that only the root 15 of the internal thread IT engages the external thread ETb (FIG. 3b) and that only the root 15a of the external thread ETa engages the internal thread ITc (FIG. 4c) at the flight Ff or Faf when the improved connection using the nut 20 or bolt 10 is in use and is subjected to axial stresses which result in the establishment of a self-locking action.

FIGS. 2 and 4a to 4c further show that the configuration of successive flights Fa of the external thread ETa can be such that the foremost flight Faf is in pronounced surface-to-surface contact with the adjacent flight Fc of the thread ITc in the nut 2, that the next-following flight Fa is in less pronounced surface-to-surface contact with the adjacent flight Fc, and so forth. However, at least one flight Fa is in mere linear contact with the adjacent flight Fc in response to axial stressing of the bolt 10 and/or nut 2. Thus, it is preferred to establish a gradual transition from mere linear contact between two neighboring flights Fa, Fc and a successively more pronounced surface-to-surface contact between neighboring flights Fa and Fc.

Figure 5:
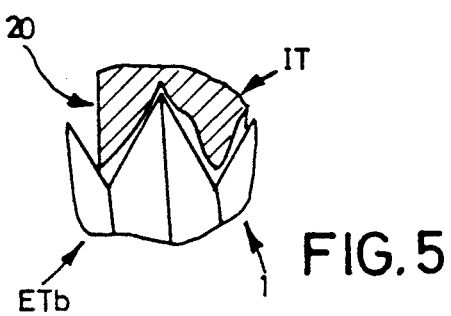
FIG. 5 is an enlarged view of a detail in FIG. 3a and shows the transition from standard screw thread to novel thread.

FIG. 5 shows on a larger scale the upper left-hand portion of FIG. 3a. It will be noted that the extent of actual contact between the threads IT and ETb is minimal or nil when the nut 20 is not acted upon by a force A or B and/or the bolt 1 is not acted upon by a force AA or BB.

FIG. 2 shows a novel bolt 10 which has an external thread ETa with flights Fa, partially flattened crest 7a, root 15a and two faces 3a, 4a which flank the crest 7a. Those portions of the faces 3a, 4a which are provided on the foremost flight Faf of the thread ETa have a convex configuration, as at 11a.

Figure 4B:
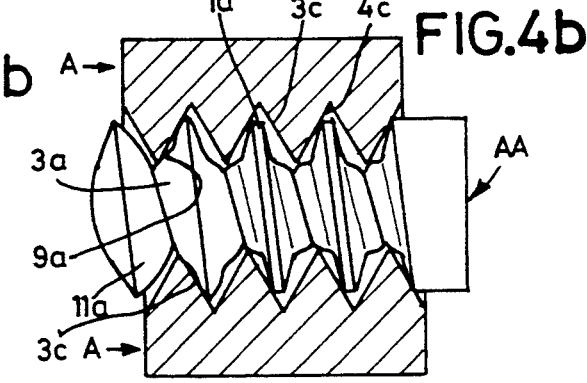
FIG. 4b shows the structure of FIG. 4a in self-locking condition as a result of the application of axial force against the female component in a direction toward the head of the male component.
Figure 4C:
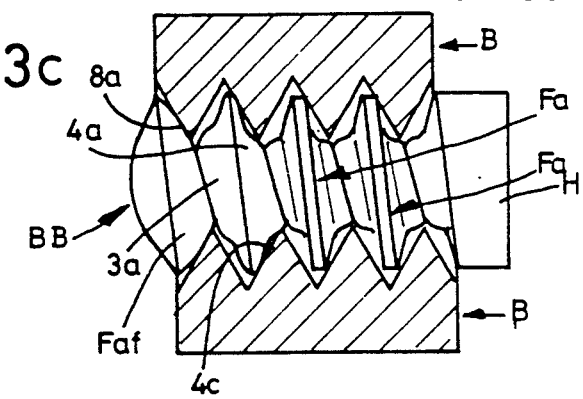
FIG. 4c shows the structure of FIG. 4a in self-locking condition as a result of the application of axial force against the female component in a direction away from the head of the male component.

FIG. 4a shows the novel bolt 10 in mesh with a standard nut 2 having an internal thread ITc with flights Fc, pointed crest, standard root and faces 3c, 4c. When the nut 2 is acted upon by a force A (and/or when the bolt 10 is acted upon by a force AA), the face 3c is maintained in linear contact with the clamping surface 9a of the thread ETa and the flattened portion of the crest 7a is in linear contact with the face 3c of the standard nut 2. This is shown in FIG. 4b. On the other hand, if the nut 2 is acted upon by a force in the direction of arrows B (and/or the bolt 10 is acted upon by a force BB), the clamping surface 8a of the external thread ETa engages the face 4c of the internal thread ITc and the flattened portion of the crest 7a engages the face 3c (see FIG. 4c).

The faces 3a, 4a of the external thread ETa on the bolt 10 are steeper than the faces 3c, 4c of the internal thread ITc in the standard nut 2.

Figure 6:
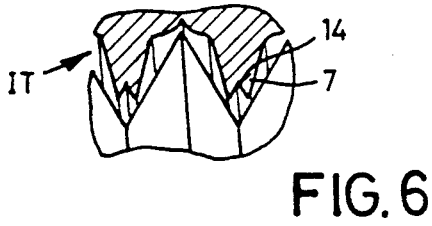
FIG. 6 is an enlarged view of another detail in FIG. 3a but showing a modified female component with a groove in the crest of its internal thread.

FIG. 6 shows that the crest 7 of an internal thread IT can be provided with a groove 14 having a substantially triangular cross-sectional outline. Such groove enhances the flexibility of the internal thread IT in the region of the crest 7.

The novel thread IT or ETa is designed in such a way that at least a portion of the face 3 or 4 on the thread IT or at least a portion of the face 3a or 4a on the external thread ETa is incongruous with the adjacent face of the other thread. Such design ensures that the incongruous faces are in mere linear contact with each other along a helix; the helix can be adjacent the root 15 or 15a of the thread IT or ETa and/or at the crest 7 or 7a.

The feature that the foremost flight Ff or Faf has at least one convex face (at 11 or 11a) ensures that only the root of such foremost flight is engaged by the adjacent face of the other thread; this is desirable and advantageous because the bolt can be driven home in a normal way, i.e., with a relatively small amount of friction. Such advantageous mode of driving the bolt home can be further enhanced by ensuring that the extent of contact between successive flights of the mating internal and external threads increases stepwise from flight to flight including a mere linear contact between a first pair of flights, a relatively small surface-to-surface contact between the adjoining pair of flights, a larger surface-to-surface contact between the next pair of flights, and so forth.

The improved threaded connection exhibits the advantage that the self-locking action can be established in response to relatively small axial displacement of the mating threads relative to each other and that a self-locking action can be established in either of two axial directions. A self-locking action in response to relatively small axial displacement of the mating threads relative to each other can be established even more reliably if the internal and/or external thread is provided with the aforediscussed clamping surfaces 8, 9 and 8a, 9a. This ensures that the crest 7 or 7a rapidly engages the adjacent clamping surface of the thread ETa or IT. The clamping surfaces further serve to center the external thread in the internal thread; this simplifies the task of driving the male component into the female component or components. The clamping surfaces 8, 9 and/or 8a, 9a can be convex, concave or partly convex and partly concave. Such configuration of the clamping surfaces further enhances their centering action upon the other thread and renders it possible to rotate the male and female components relative to each other with a minimum of effort (in the absence of relatively large forces acting in the direction of arrow AA or BB or in the direction of arrows A or B). It is normally desirable to ensure that the male component can be readily rotated relative to the female component for the purpose of driving the male component home because this ensures that a relatively small force is needed to prevent rotation of the female component or components with the rotating male component or vice versa. Moreover, the clamping surfaces render it possible to achieve relatively long clamping zones without the need for extensive axial shifting of the non-rotating male component relative to the non-rotating female component and/or the other way around. Still further, convex clamping surfaces or convex portions of clamping surfaces ensure that the clamping action is very pronounced in response to relatively small or minimal axial shifting of the non-rotating male component relative to the non-rotating female component or components and/or vice versa (arrows A, B, AA, BB in FIGS. 3a–3c and 4a–4c). If the crest of a thread engages an adjacent concavo-convex clamping surface in the region of transition between the convex and concave portions of the clamping surface, the arresting action upon the crest in response to the establishment of a self-locking action is more reliable and more stable because one achieves a closer approximation to a parallelism with the common axis of the mating components. The convex portion of a clamping surface is preferably nearer to the start of the concavo-convex clamping surface to thus ensure a stabilization of the mass and counteract the tendency of shearing the thread.

The provision of two clamping surfaces ensures that the nut cannot be improperly mounted on the male component. The nut performs the function of a lock nut and, moreover, it is not necessary to store separate supplies of right-hand and left-hand nuts. This brings about substantial savings in storage space.

Figure 7:
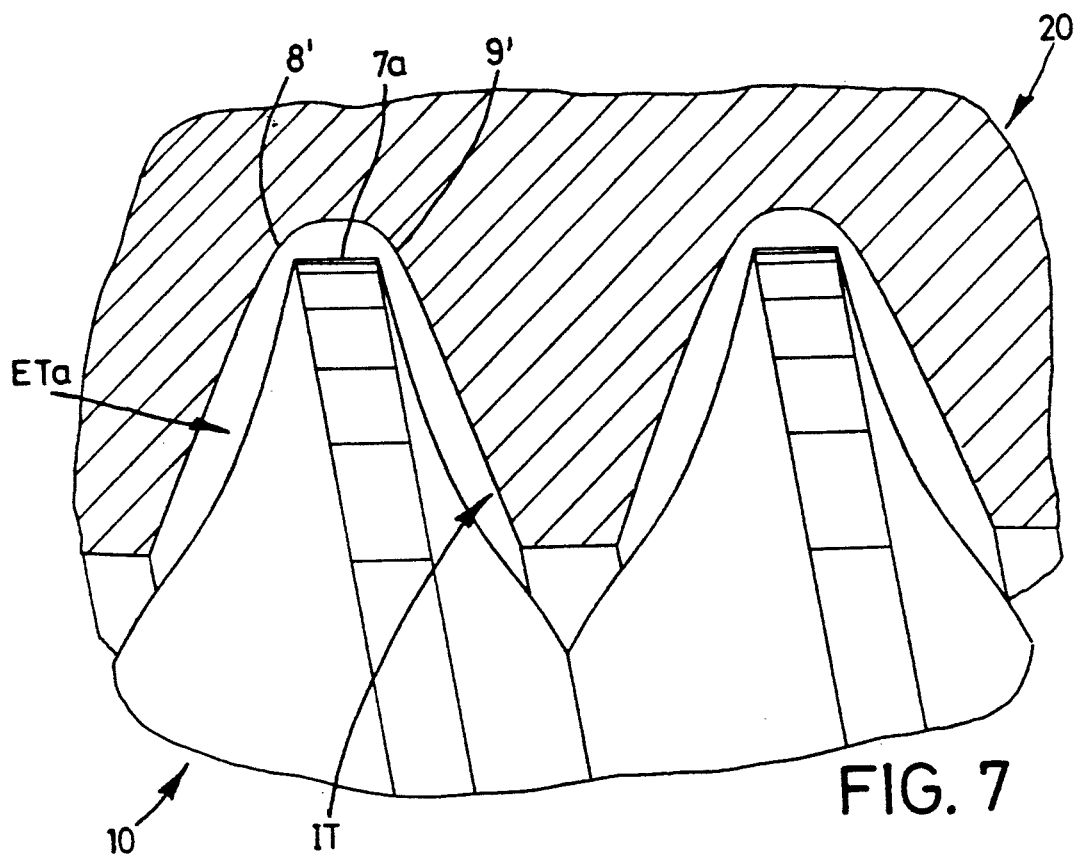
FIG. 7 is an enlarged fragmentary partly elevational and partly axial sectional view of a modified threaded connection.
Figure 8:
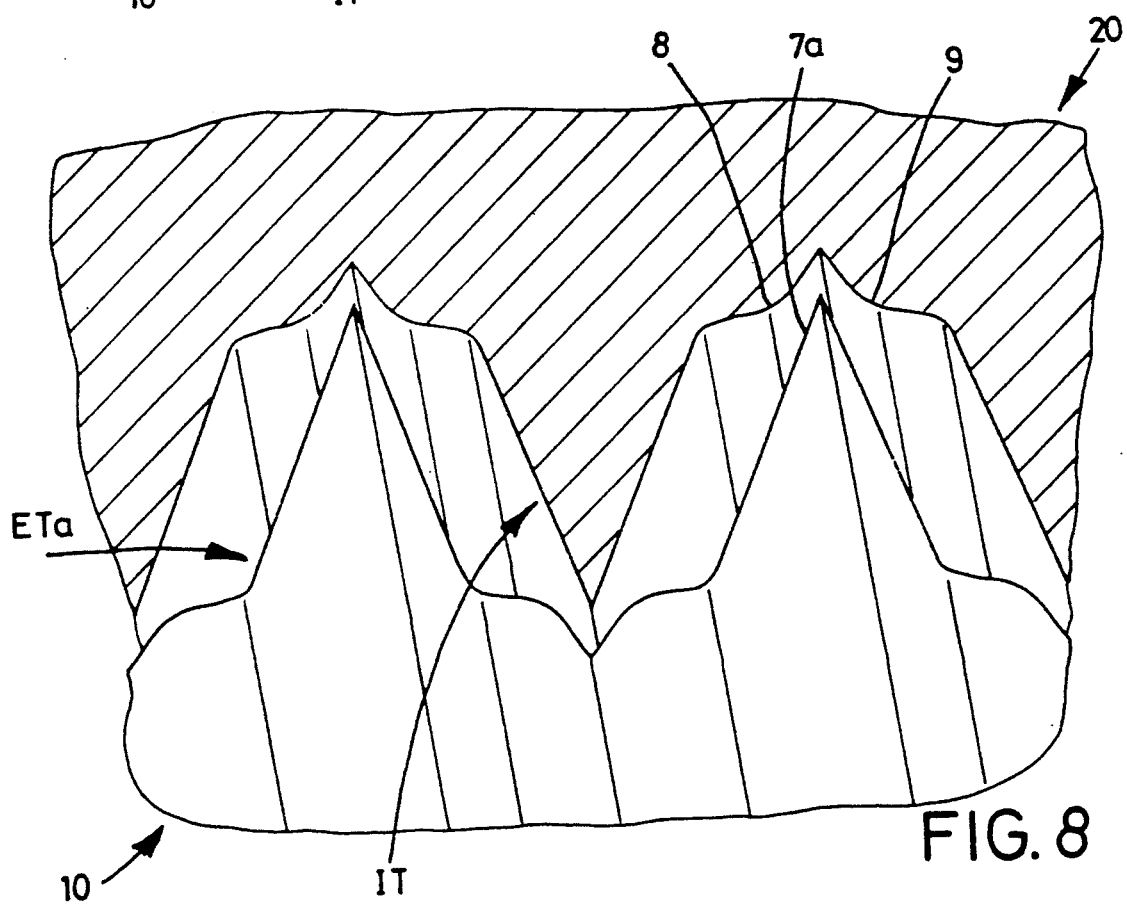
FIG. 8 a similar enlarged fragmentary partly elevational and partly axial sectional view of a threaded connection which employs the female component of FIG. 1.

FIGS. 7 and 8 show that the improved threaded connection can comprise a novel nut 20 and a novel bolt 10. More specifically, FIG. 7 shows a flattened crest 7a of the external thread ETa adjacent two concave clamping surfaces 8', 9' of the internal thread IT, and FIG. 8 shows a pointed crest 7a adjacent convex clamping surfaces 8, 9 of the internal thread IT.

Figure 9:
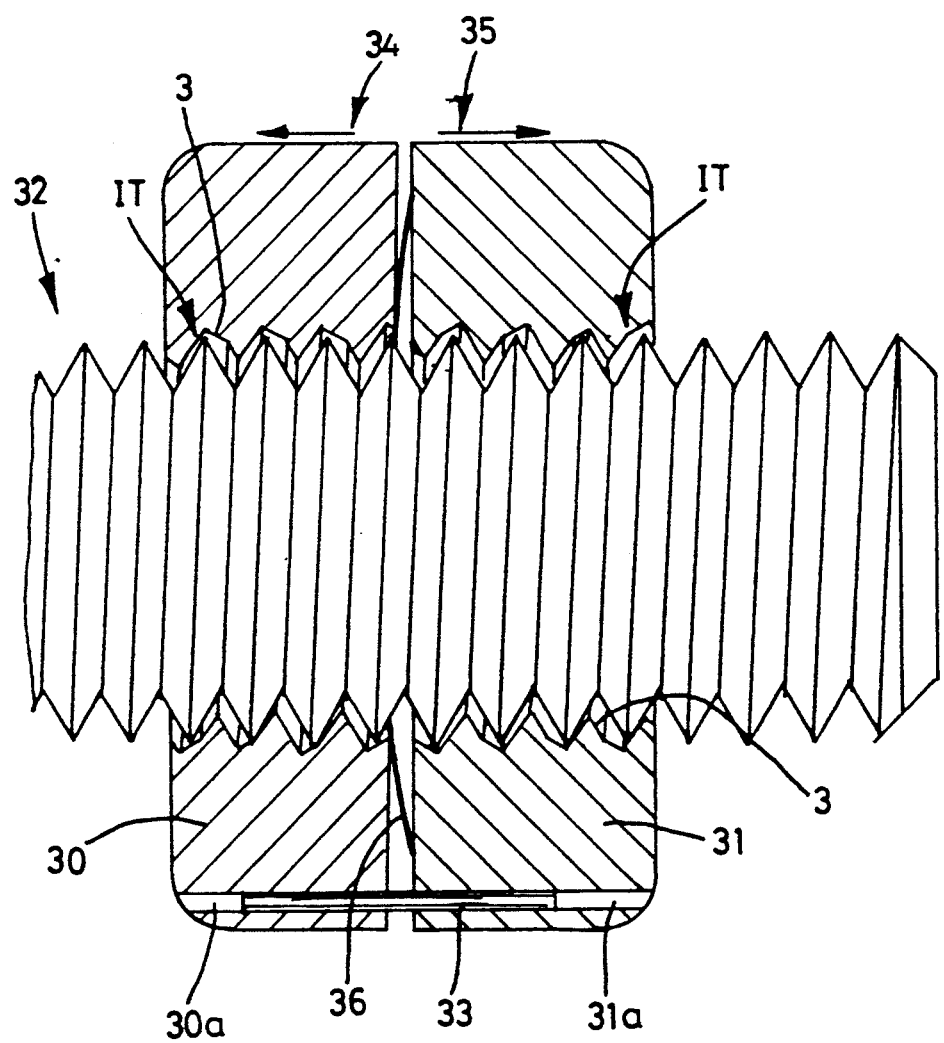
FIG. 9 is a partly elevational and partly axial sectional view of a threaded connection wherein the male component mates with two female components.

FIG. 9 shows a male component 32 in the form of an elongated spindle or feed screw 32 which mates with two female components in the form of nuts 30 and 31. The nuts have aligned axially parallel bores or holes 30a, 3a which can receive a removable coupling element in the form of a pin or stud 33 serving to ensure that the nut 31 cannot turn relative to the nut 30 and/or vice versa. The coupling pin 33 can be readily expelled or otherwise removed from the holes 30a, 31a to permit turning of the nut 30 relative to the nut 31 and/or vice versa. The arrows 34 and 35 indicate the directions in which the nuts 30, 31 can be caused to move in response to rotation relative to the male component 32.

The internal threads IT of the nuts 30, 31 are mirror images of each other, i.e., the face 3 of the thread in the nut 30 faces in one axial direction and the face 3 of the thread in the nut 31 faces in the opposite direction. However, the directional neutrality is not affected because such principle remains intact if the nuts are inverted.

A concavo-convex clamping member can be provided for each of the nuts 30, 31, or such clamping member (shown at 36) can be installed between the nuts 30 and 31 of FIG. 9. When the nuts 30, 31 are caused to move toward each other, the clamping member 36 undergoes deformation and acts not unlike a diaphragm spring to maintain the nuts in axially stressed condition and to thus ensure the establishment and maintenance of a self-locking action. A similar or analogous clamping member can be used to act upon a single nut (e.g., upon the nut 20 of FIGS. 3a to 3c or the nut 2 of FIGS. 4a to 4c in the direction of arrow A or B, or upon the bolt 1 or 10 in the direction of arrow AA or BB.

The clamping face of the internal thread IT of the front nut 31 faces rearwardly and the clamping face of the internal thread IT of the rear nut 30 faces forwardly. However, and as stated above, the directional neutrality remains intact because the principle remains unchanged as a result of changing the orientation of the nuts. The internal threads of the two nuts are different and must be separately produced. For example, it is also desirable to ensure that the connection between the two nut halves does not affect the freedom of the nuts to turn. The effect of the twin-nut principle is that directional neutrality is established even if each nut has a single clamping surface. The application of nuts to the male component 32 is simplified and can be completed within a shorter internal of time by non-rotatably connecting the nuts to each other. The nuts 30, 31 or any other internally threaded components can be securely anchored on a spindle (32) without the need for an abutment which would limit the extent of axial movability of the nut 30 or 31 in the one or the other axial direction of the male component 32. A self-locking action is achieved by rotating the nut 30 relative to the nut 31 and/or vice versa. It suffices to effect an axial displacement through a fraction of one millimeter, e.g., to rotate the nut 30 relative to the nut through a small fraction of a single turn, in order to achieve a reliable self-locking action. At such time, the force which is needed to move one of the nuts axially relative to the other nut serves primarily to enhance the clamping action.

The invention also relates to a thread cutting or forming tool which can be used to form the internal thread IT and the external thread ETa. The improved self-locking threaded connection can be used with advantage in many types of surgical and related instruments, such as those described and shown in the aforementioned commonly owned copending patent application Ser. No. 07/629,996 for "Screw for use in osteosynthesis".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A threaded connection comprising a male component having an external screw thread and at least one female component having an internal screw thread, each of said threads having a plurality of flights, a root, a crest and two faces flanking the crest, at least one face of at least some flights of at least one of said threads having an inclination which departs from the inclination of the adjacent face of the respective flight of the other of said threads and said at least one face of each of said at least some flights of said at least one thread is asymmetrical to said adjacent face when said male component mates with said at least one female component, said threaded connection establishing a clearance between the faces of said threads of said male and female components in the absence of appreciable axial stressing of at least one of said components so that the faces of said thread of said male component and the faces of said thread of said at least one female component are free to move relative to each other, said connection being self-locking in response to axial stressing as a result of axial displacement of said male and female components relative to each other in the direction of stressing to thereby engage one of said asymmetrical faces with the adjacent face, one of said thread faces having a plurality of orientation changes at the root of the respective thread, said orientation changes together imparting to said thread face a substantially concave-convex shape.

2. The connection of claim 1, wherein the crests of said at least some flights are rounded.

3. The connection of claim 1, wherein said orientation changes are nonsymmetric with respect to the adjacent face.

4. The connection of claim 1, wherein the crests of said at least some flights are flattened.

5. The connection of claim 1, wherein said at least one thread has a foremost flight and at least one face of said at least one thread has a convex portion provided on said foremost flight and configurated to ensure that said foremost flight engages the other thread only at the root of the other thread.

6. The connection of claim 1, wherein the faces of said at least some flights of said at least one thread define a helical groove at the root of such thread.

7. The connection of claim 1, wherein the flights of said at least one thread include a first flight which is in substantially linear contact with the other thread and at least one additional flight which is in surface-to-surface contact with the other thread.

8. The connection of claim 7, wherein at least one thread includes a series of additional flights each of which is in a different surface-to-surface contact with the other thread, the extent of surface-to-surface contact increasing from additional flight to additional flight in a direction away from said first flight.

9. The connection of claim 8, wherein said first flight is said at least one flight.

10. The connection of claim 1, wherein the crest of said at least one flight has a groove.

11. The connection of claim 1, comprising two female components which are rotatable relative to each other while in mesh with said male component, said at least one thread being the internal thread of said at least one female component and the other of said female components having a second internal thread with a plurality of flights, two faces, a crest and a root, at least one face of at least one flight of said second internal thread having an inclination which departs from the inclination of the adjacent face of the respective flight of said external thread so that said at least one face of said at least one flight of said second internal thread is incongruous with the adjacent face of said external thread when said other female component mates with said male component.

12. The connection of claim 11, wherein the faces of each of said internal threads include a first face and a second face, said at least one face of the internal thread of said at least one female component being the first face of such thread and said at least one face of said internal thread of said second female component being the second face of such thread.

13. The connection of claim 12, further comprising means for non-rotatably coupling said female components to each other.

14. The connection of claim 12, further comprising a deformable clamping member for at least one of said female components.

15. The connection of claim 14, wherein said clamping member is disposed between said female components when said female components mate with said male component.

* * * * *